(12) United States Patent
Bok et al.

(10) Patent No.: US 7,991,435 B2
(45) Date of Patent: Aug. 2, 2011

(54) METHOD AND APPARATUS FOR SETTING SCREEN IN MOBILE TERMINAL

(75) Inventors: Il Geun Bok, Seoul (KR); Byeong Cheol Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 401 days.

(21) Appl. No.: 11/652,267

(22) Filed: Jan. 11, 2007

(65) Prior Publication Data

US 2007/0186181 A1   Aug. 9, 2007

(30) Foreign Application Priority Data

Feb. 9, 2006   (KR) .................. 10-2006-0012434

(51) Int. Cl.
H04B 1/38   (2006.01)
(52) U.S. Cl. .................. 455/566; 455/550.1; 455/412.1
(58) Field of Classification Search .................. 345/660, 345/173; 455/412.1, 566, 550.1, 575.1
See application file for complete search history.

(56) References Cited

U.S. PATENT DOCUMENTS

| 6,466,203 | B2 * | 10/2002 | Van Ee .................. 345/173 |
| 2002/0180763 | A1 * | 12/2002 | Kung .................. 345/660 |
| 2004/0207722 | A1 * | 10/2004 | Koyama et al. .......... 348/14.02 |
| 2004/0209642 | A1 * | 10/2004 | Kim .................. 455/550.1 |
| 2005/0153746 | A1 * | 7/2005 | Yoon .................. 455/566 |
| 2005/0168566 | A1 * | 8/2005 | Tada et al. .......... 348/14.01 |
| 2005/0277448 | A1 * | 12/2005 | Castaneda et al. ...... 455/575.1 |
| 2007/0043792 | A1 * | 2/2007 | O'Brien .................. 707/205 |

* cited by examiner

*Primary Examiner* — Lun-Yi Lao
*Assistant Examiner* — Nathan Taylor
(74) *Attorney, Agent, or Firm* — The Farrell Law Firm, P.C.

(57) ABSTRACT

A mobile communication terminal includes a display unit for displaying an image for screen setting; a screen setting information storage unit storing screen setting information; a key input unit receiving a type of screen for the screen setting and selection information of user for an image edit command; a controller displaying a preview domain identical with the selected screen in type and size based on the selection information of the user for the type of the screen, and controlling an image edit in the preview domain based on the selection information of the user for the image edit command; and an image processor changing indication information of the display unit by control of the controller.

18 Claims, 5 Drawing Sheets

| NO | TYPE OF SCREEN | SIZE | LOCATION | IMAGE INFORMATION |
|---|---|---|---|---|
| 1 | WAITING SCREEN | $x_1 * y_1$ | $(x_1\ y_1)$ | IMAGE 1 |
| 2 | OUTER SCREEN | $x_2 * y_2$ | $(x_2\ y_2)$ | IMAGE 2 |
| ⋮ | ⋮ | ⋮ | ⋮ | ⋮ |

METHOD AND APPARATUS FOR SETTING SCREEN IN MOBILE TERMINAL

PRIORITY

This application claims priority to an application entitled "Method and Apparatus For Setting Screen In Mobile Terminal" filed in the Korean Intellectual Property Office on Feb. 9, 2006 and assigned Serial No. 2006-0012434, the contents of which are incorporated herein by reference.

BACKGROUND OF THE INVENTION

1. Field of the Invention

The present invention relates to a mobile communication terminal, in particular, to screen setting of a mobile communication terminal.

2. Description of the Background Art

As mobile communications technology has developed and mobile communication terminals have been widely distributed, the mobile communication terminal is able to support various functions such as text transfer and image transmission, as well as dialing. Moreover, mobile communication terminals mounting a camera, or camera-phones, have been widely distributed. Such mobile communication terminals can perform downloading through a mobile radio communication network or can store an image, which is obtained through taking a picture.

The stored images can be used as a background picture or photo ID, which is a photo for address book, of the mobile communication terminal. For this, the mobile communication terminal reduces or enlarges the whole-area of an image selected by a user in a constant rate to fit the resolution of the mobile communication terminal display device, such as an LCD. If the aspect ratio rate of an image selected is different from the aspect ratio rate of the display device, the mobile communication terminal must perform a clipping on a part of the image exceeding the display region after magnifying the image to display the image in the whole display device. Otherwise, part of the display device had to be processed as a margin after reducing the image to display the whole image.

In addition, in case of only enlarging some part of an image stored in the mobile communication terminal for a background picture, the user must perform editing through an image editor installed in the external device, such as a Personal Computer (PC), to form a desired image. For this, the user must transmit the image through a wireless network in a specific site, download the image stored in the site into the PC where the image editor is installed to edit the image in a desired form, and transmit the edited image to the mobile communication terminal. Such a process is inconvenient for the user.

Furthermore, in a conventional technology, there is not provided a preview fuction that shows the edited image in advance. Therefore, the user had to know the resolution of the mobile communication terminal display device, for example the LCD, to generate the desired image.

As described above, the conventional editing procedure of an image for screen setting of the mobile communication terminal was very complicated. Further, due to the absence of preview fuction, sometimes an unintended result of image editing was generated.

SUMMARY OF THE INVENTION

Accordingly, an object of the present invention is to solve at least the problems and disadvantages of the prior art.

The present invention provides an apparatus and method capable of facilitating an image editing for screen setting of a mobile communication terminal. Further, the present invention provides an apparatus and method of reducing an erroneous image editing by showing the result of image editing for the screen setting in advance.

A mobile communication terminal according to the present invention comprises a display unit displaying an image for screen setting of a mobile communication terminal; a screen setting information storage unit storing screen setting information of the mobile communication terminal; a key input unit receiving a type of the screen for the screen setting of the mobile communication terminal and selection information from a user for an image edit command; a controller displaying a preview domain identical with the selected screen in type and size based on the selection information of the user for the type kind of the screen, and controlling an image edit in the preview domain based on the selection information of the user for the image edit command; and an image processor changing indication information of the display unit by the control of the controller.

BRIEF DESCRIPTION OF THE DRAWINGS

The present invention will be described in detail with reference to the following drawings in which like numerals refer to like elements. The accompany drawings, which are included to provide a further understanding of the invention and are incorporated in and constitute a part of this specification, illustrate embodiments of the invention and together with the description serve to explain the principles of the invention. In the drawings.

DETAILED DESCRIPTION OF PREFERRED EMBODIMENTS

Preferred embodiments of the present invention will be described in a more detailed manner with reference to the drawings. Reference will now be made in detail to embodiments of the present invention, examples of which are illustrated in the accompanying drawings.

Figure 1:
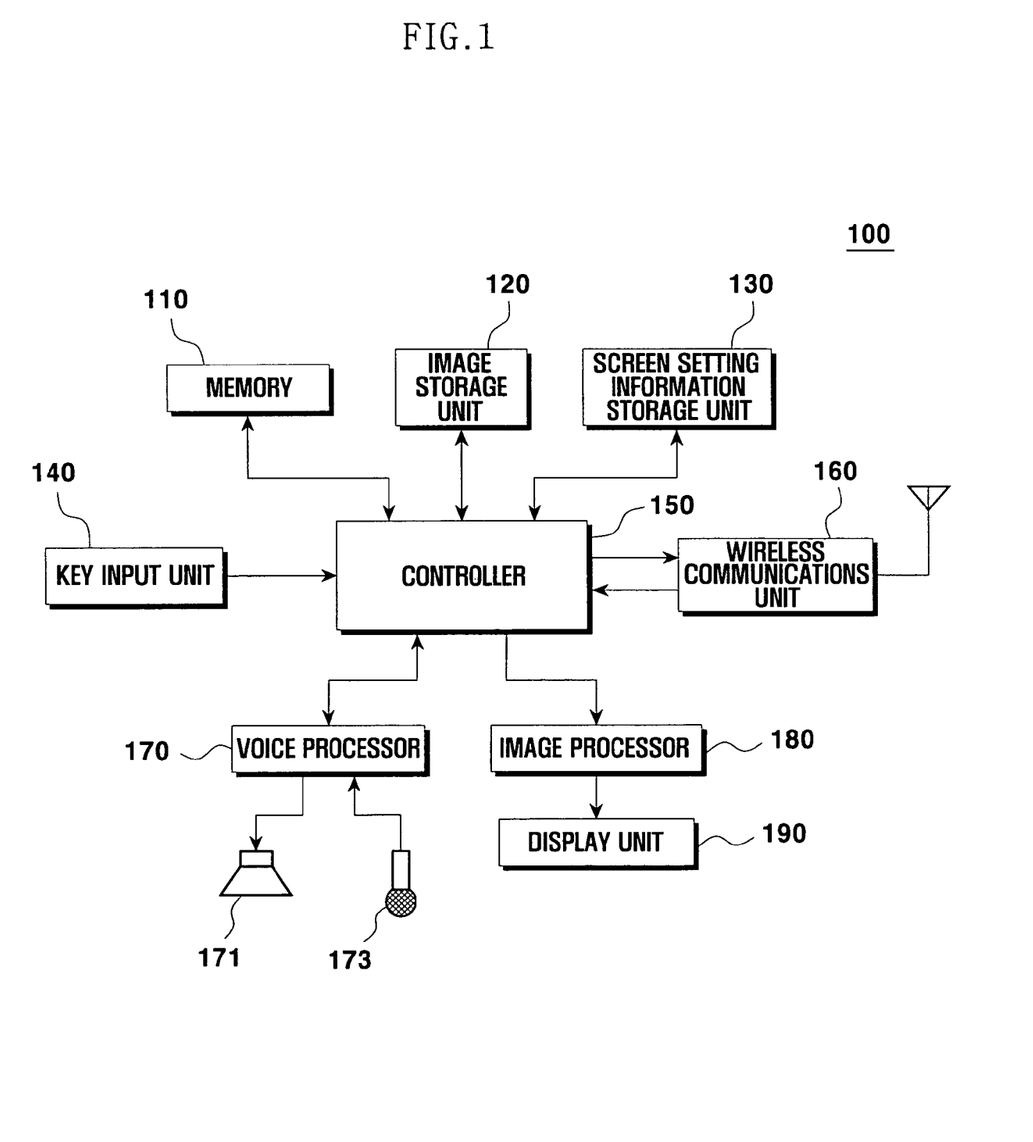
FIG. 1 is a block diagram illustrating a mobile communication terminal according to the present invention.

FIG. 1 is a block diagram illustrating a mobile communication terminal according to the present invention.

Referring to FIG. 1, a mobile communication terminal 100 according to the present invention includes a memory 110, an image storage unit 120, a screen setting information storage unit 130, a key input unit 140, a controller 150, a wireless communications unit 160, a voice processor 170, a speaker 171, a microphone 173, an image processor 180 and a display unit 190.

The memory 110 stores information relating to the operation of the mobile communication terminal 100, for example, a driving program for system driving control, data relating to the program, a telephone directory, an address book and a short message.

The image storage unit 120 stores image information. For example, an image downloaded through the mobile radio communication network or an image obtained by itself through a camera (not shown) mounted in the mobile communication terminal 100 is stored.

Preferably, the image storage unit 120 stores image information including an image identification number, an image file name, an image file generation date, an image file size and decoding data classified by image. The screen setting information storage unit 130 stores screen setting information of the mobile communication terminal 100.

For example, the screen setting information storage unit 130 stores screen information which can be set in the mobile communication terminal 100, such as a normal screen, an outer screen, a screen in call connection, a screen in power-on, and image information corresponding to the screen information, such as the screen size, a location and image data.

Figure 2:
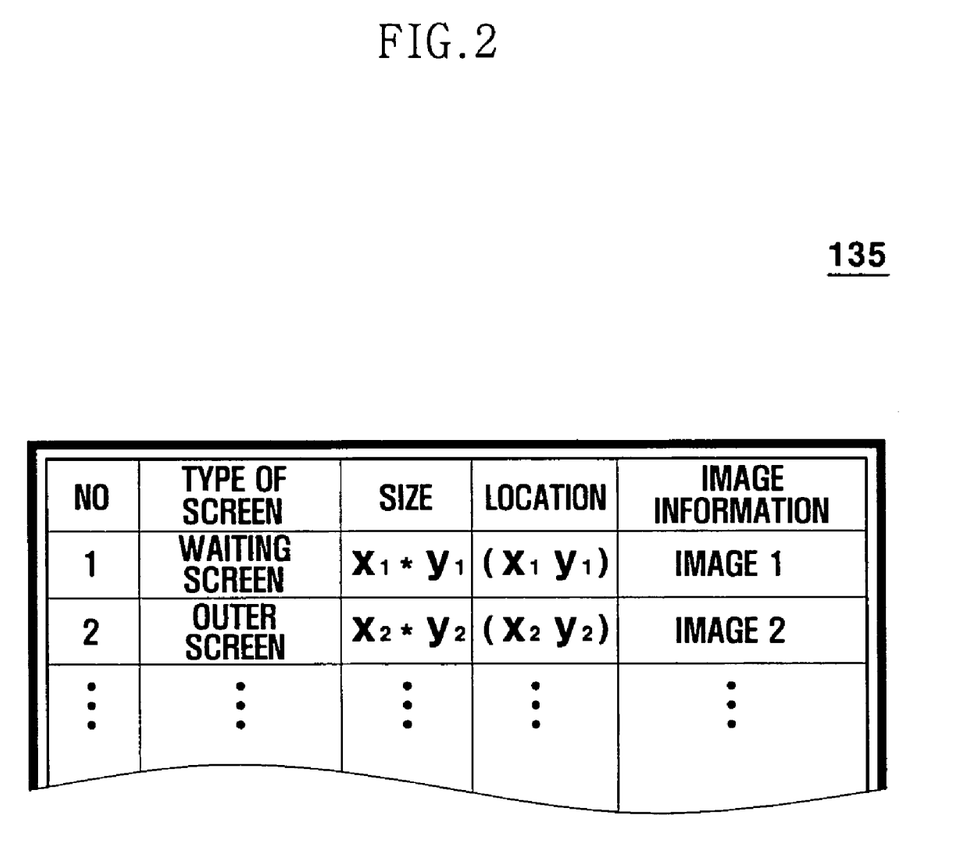
FIG. 2 illustrates an exemplary database structure which manages screen setting information in a mobile communication terminal according to the present invention.

The example of a database structure of the screen setting information storage unit 130 is illustrated in FIG. 2.

The key input unit 140 inputs an operating signal of a user. For example, an interface with the user is provided in order to input the operating signal of the user for the operation control of the mobile communication terminal 100. In particular, the key input unit 140 receives the operating signal of the user for the screen setting of the mobile communications terminal 100 to deliver the signal to the controller 150. For example, a kind of screen for the screen setting is inputted and delivered to the controller 150.

Moreover, the key input unit 140, in a screen setting mode, receives selection information of the user for enlargement and reduction of an image for display on the display unit 190, such as zoom select information, line of sight movement select information and select information for image decision, and delivers the information to the controller 150.

At this time, it is preferable that a side key, such as volume key, installed in the side of the mobile communications terminal 100 or a four direction key, such as navigation key, installed in the keypad of the mobile communication terminal 100 is used for selection information of the user, such as zoom select information, and line of sight movement select information. Further, the key input unit 140 can be established with a software-button implemented as a touch screen as well as a key-button of hardware.

In case of implementing the key input unit 140 with the touch screen, it is preferable to display the soft button for inputting the selection information of the user, such as zoom select information, and line of sight movement select information, on the preview screen, so that the user can make a selection.

In this case, in the preview screen, the user is able to directly edit the image, for example, the user is able to perform enlargement, reduction, moving and decision of the screen for applying. In this way, the implementing of soft button in the preview screen is exemplified in FIG. 3

The controller 150 controls the mobile communication terminal 100 based on a signal putted through the key input unit 140 or an operation program stored in the memory 110. Particularly, the controller 150 controls the image processor 180 in order to generate image information displayed on the display unit 190 based on the selection information of the user inputted through the key input unit 140 in the screen setting mode. For this, the controller 150 delivers the control signal to the image processor 180 based on the selection information of the user.

For example, if a kind of screen for the screen setting is input through the key input unit 140, the controller 150 delivers the control signal for indicating a preview domain of the selected screen to the image processor 180. For this, the controller 150 delivers a control signal to the image processor 180, which is used for receiving the size information of the selected screen from the screen setting information storage unit 130 to indicate the preview domain corresponding to the size to the display unit 190.

Moreover, when a 'zoom in' function for the enlargement of an image to be displayed or a 'zoom out' function for the reduction of the image is selected through the key input unit 140, the controller 150 delivers the control signal for magnifying or reducing the image to be displayed to the image processor 180. When the line of sight movement function on the image to be displayed is selected through the key input unit 140, the control signal for moving the center of the display domain among the whole image area is delivered to the image processor 180.

In the meantime, if the selection information for image decision is input through the key input unit 140, the image mode in the display unit 190 corresponds to the image information for a specific screen, such as a normal screen and an outer screen by the controller 150.

For this, a kind of screen input through the key input unit 140 corresponds to the image mode in displaying by the controller 150 to be stored in the screen setting information storage unit 130. For example, the image information including the size of image, the expansion ratio of original image, and line of sight movement information correspond to a kind of screen to be stored, or the image itself in displaying corresponds to the kind of the screen to be stored by the controller 150.

At this time, the controller 150 maintainins the original copy of an image stored in the image storage unit 120, setting up the display mode of the image of the screen as the image corresponding to the kind of the screen selected by the user.

For example, preferably, when a specific image is read from the image storage unit 120 for editing and the image corresponds to the specific screen, the controller 150 maintainins the original image stored in the image storage unit 120, while only the edited image corresponds to the kind of the screen to be stored in the screen setting information storage unit 130 by the controller 150.

On the other hand, preferably, after the edited image is added to the image storage unit 120, the image information corresponds to the kind of the screen to be stored in the screen setting information storage unit 130. Therefore, detailed information such as size or resolution of the display unit 190 is not required. Moreover, difficult editing does not need to be done.

The wireless communications unit 160 provides a communications interface through a wireless network. The voice processor 170 performs processing on a voice signal that will be output through the speaker 171 and on a sound signal input through the microphone 173 under the control of the controller 150.

The speaker 171 outputs the sound signal delivered through the voice processor 170. The microphone 173 collects sound signals such as the voice of the user delivers it to the voice processor 170.

The image processor 180, under the control of the controller 150, performs processing on the image that will be displayed through the display unit 190, changes the current display mode of the display unit 190.

For example, the image processor 180 receives a control signal indicating a preview domain on the specific screen from the controller 150 and indicates the preview domain in the display unit 190. It is desirable for the image processor 180 to store the size information classified by the kind of the screen can be set up in the mobile communication terminal 100.

However, the size information classified by the kind of the screen may be stored in the controller 150. In this case, preferably, the controller 150 delivers the control signal indicating the preview domain on the specific screen and the size information of the screen.

Further, the image processor 180 receives the control signal to enlarge or reduce the screen from the controller 150. For this, the image processor 180 stores the reference point for enlarging or reducing the image and the magnification information in advance. It is desirable to enlarge or reduce the image based on this information.

At this time, the reference point for enlargement or reduction and the magnification information may be stored in the controller 150 or in an additional storage, while the image processor 180 may receive the information through the controller 150 to enlarge or reduce the image.

Moreover, the image processor 180 receives the control signal for the line-of-sight movement from the controller 150 to move the center of the image area for displaying on the display unit 190. In particular, the image processor 180 moves the center of the image area displayed in the preview domain in the display unit 190.

The image processor 180 stores movement interval information for the line-of-sight movement in advance and moves the center of the image area based on the information. At this time, the movement interval information for the line-of-sight movement is stored in the controller 150 or in the additional storage while the image processor 180 may receive the information through the controller 150 to move the center of the image area.

The display unit 190 displays the image information delivered from the image processor 180, changing the current display mode of the image under the control of the image processor 180. It is preferable that the display unit 190 includes a touch pad in the upper side when the key input unit 140 is a software button which is implemented as a touch screen.

FIG. 2 illustrates an exemplary database structure which manages screen setting information in a mobile communication terminal according to the present invention.

Referring to FIG. 2, the database 135 stores a kind of screen, size information corresponding to the screen, location information and image information.

In FIG. 2, as to "normal screen", the size is '$x_1 * y_1$', the location starts in $x_1, y_1$, and the corresponding image information is "image 1", while, as to "outer screen", the size is '$x_2 * y_2$', the location starts in $x_2, y_2$, and the corresponding image information is "image 2". At this time, "image information" directly stores the corresponding image file and/or identifying information stored in the image storage unit 120.

Figure 3:
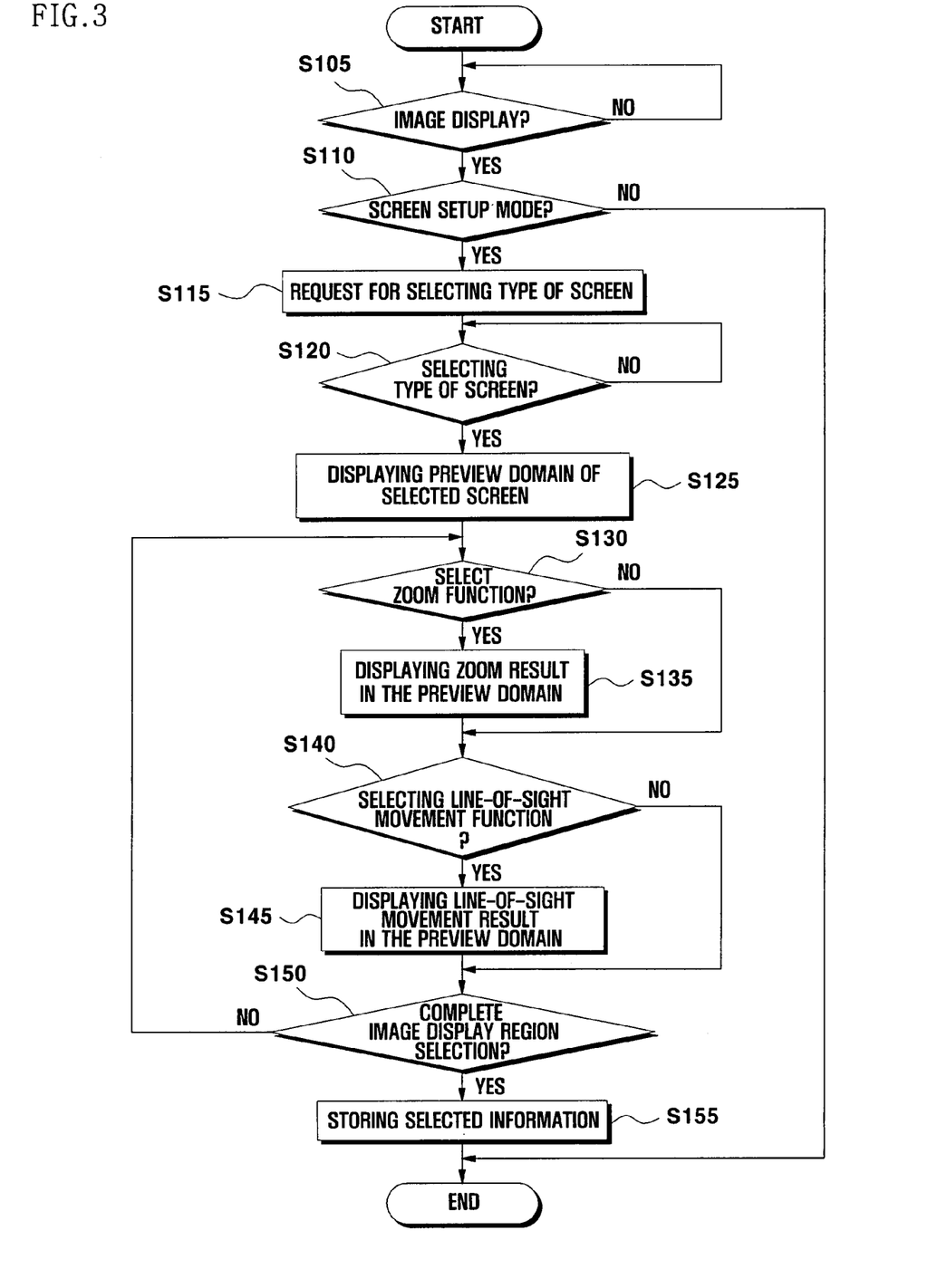
FIG. 3 is a flow chart illustrating a screen setting method of a mobile communication terminal according to the present invention.

FIG. 3 is a flow chart illustrating a screen setting method of a mobile communication terminal according to the present invention.

Referring to FIG. 1 and FIG. 2, the screen setting method of the mobile communication terminal according to the present invention is as follows.

If the mobile communications terminal 100 is operated in the screen setup mode when the image is displayed in the display unit 190 (S105 and S110), the mobile communication terminal 100 requests the selection of a kind of the screen from a user (S115). The controller 150 displays the screen kind selection menu to the display unit 190.

The display unit 190 indicates the preview domain of the selected screen if the user selects kind of the screen in response to the request (S115, S120, S125). The display unit 190 receives the size information of the preview domain on the screen from the image processor 180 to indicate the preview domain based on the size information. At this time, the size information of the preview domain may use the size information classified by the kind of the screen. Therefore, the size of the preview domain is substantially the same as the kind of the screen selected by user. In the meantime, the size information classified by the kind of the screen is stored/managed in the screen setting information storage unit 130, and is delivered to the display unit 190 through the controller 150 and the image processor 180. However, the size information classified by kind of the screen may be stored/managed in the controller 150 or in the image processor 180. In this way, the mobile communication terminal 100 indicating the preview domain in the display unit 190 queues the image selection information from the user.

If the user selects the zoom function for magnifying or reducing an image such as zoom-in or zoom-out (S130), the display unit 190 indicates the zoom result in the preview domain in response to the zoom function selection (S135). The controller 150 generates a control signal for magnifying or reducing the image in displaying in response to the zoom-function selection signal, and delivers the signal to the image processor 180. The image processor 180 enlarges or reduces the image information displayed on the display unit 190 based on the stored information on image enlargement or reduction such as the reference point and the magnification information.

At this time, the reference point and the magnification information for enlargement and reduction is stored in the additional storage while the image processor 180 receives the information through the controller 150 to enlarge or reduce the image. Moreover, the display unit 190 indicates the result of line-of-sight movement in the preview domain when the user selects the line-of-sight movement function on the image (S140, S145).

The controller 150 delivers the control signal for moving the display area among a whole-area displayed such as the center of the preview domain to the image processor 180. The image processor 180 moves the center of the image area displayed in the preview domain based on the stored line-of-sight movement information such as movement interval information. At this time, the movement interval information for the line-of-sight moving is stored in the controller 150 or in the additional storage while the image processor 180 receives the information through the controller 150 to move the center of the image domain.

When the user inputs the image display region selection completion signal such as selection information for the image decision (S150) after the desired state of the image is selected through repeating the line-of-sight movement function, the controller 150 stores the selected information (S155).

That is, the controller 150 matches the kind of the screen selected in step S120 with the image mode selected by repeating step S130 to step S145 for storing in the screen setting information storage unit 130. At this time, the controller 150 sets up the display mode of the image on the screen as the image corresponding to the kind of screen selected by the user with maintaining the original copy.

For example, when a specific image is read from the image storage unit 120 to edit while the edited image corresponds to a specific screen, the controller 150 matches the edited image with the kind of screen while maintaining the original image stored in the image storage unit 120 for storing in the screen setting information storage unit 130.

Further, after the edited image is added to the image storage unit 120, the image information corresponds to the kind of screen to be stored in the screen setting information storage unit 130.

Figure 4:
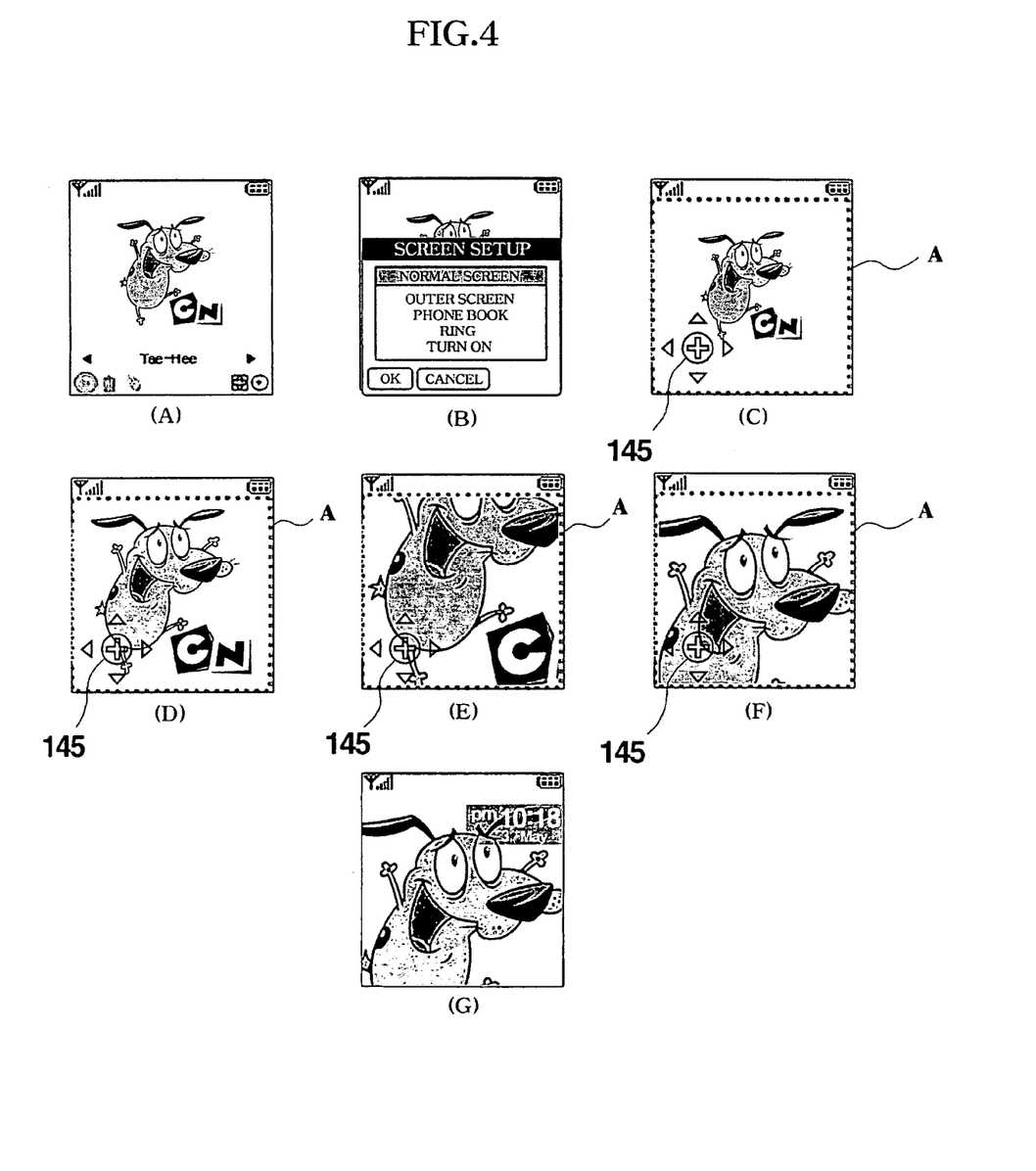
FIG. 4 illustrates exemplary screens of a background picture of a mobile communication terminal according to the present invention.
Figure 5:
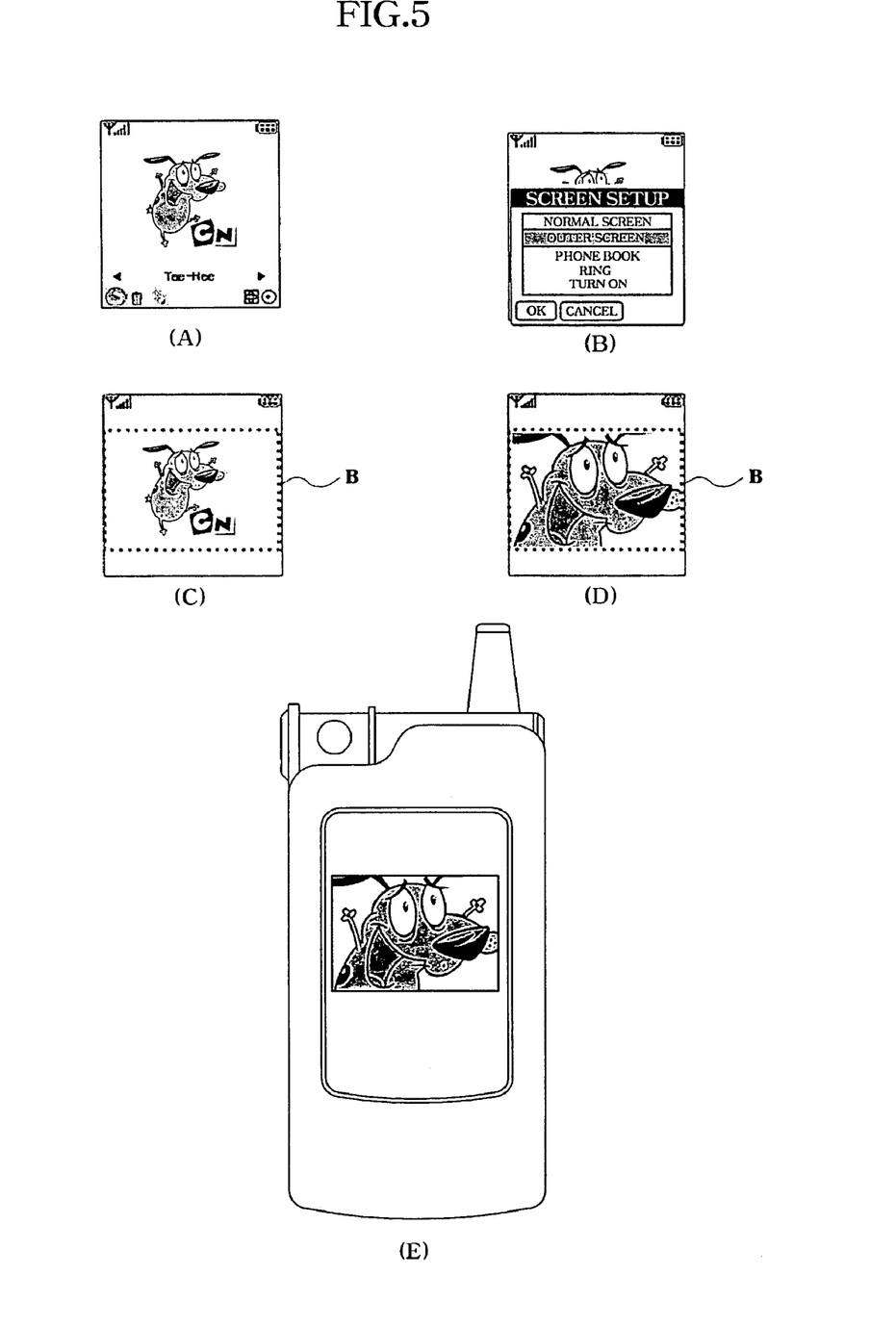
FIG. 5 illustrates exemplary screens of the outer screen of a mobile communication terminal according to the present invention.

FIG. 4 and FIG. 5 are sample screens displayed on a mobile communication terminal in the screen setting of the mobile communication terminal according to the process described above. FIG. 4 illustrates exemplary screens with a background picture of a mobile communication terminal according to the present invention. FIG. 5 illustrates exemplary screens with the outer screen of a mobile communication terminal according to the present invention.

FIG. 1, FIG. 4, and FIG. 4A exemplify the state where an image is displayed in the display unit 190. FIG. 4B exemplifies the state where a user selects "normal screen" in the state where the screen kind selection menu is displayed in the screen setting mode of the mobile communication terminal. FIG. 4C exemplifies the state where the preview domain A on "normal screen" and screen zoom and line-of-sight movement indicator 145 are indicated.

The screen zoom and line-of-sight movement indicator 145 is a soft button for inputting user selection information on the zoom function and the line-of-sight movement function, and is selectively indicated.

As shown in FIG. 4C, when the screen zoom and line-of-sight movement indicator 145 is indicated on the screen, a user can perform zoom and line-of-sight movement on the image by manipulating the screen zoom and line-of-sight movement indicator 145. That is, the line-of-sight movement is performed in a target direction by using an up/down/left/right navigation key while the zoom function is performed using a center button.

FIG. 4D exemplifies the state where the image exemplified in FIG. 4C is magnified based on the stored expansion ratio when a user requests zoom-in enlargement in FIG. 4C. FIG. 4E exemplifies the state where the image exemplified in FIG. 4D is magnified based on the stored expansion ratio when a user requests zoom-in enlargement in FIG. 4D.

As a result, FIG. 4E exemplifies the magnified result of the image in FIG. 4C which is magnified twice. FIG. 4F exemplifies the state where the image in line of sight in FIG. 4E is moved at the request of a user. FIG. 4G exemplifies a display mode of "normal screen" set up by using the edited image of FIG. 4F.

In the meantime, referring FIG. 1 and FIG. 5, FIG. 5A exemplifies the state where an image is displayed in the display unit 190. FIG. 5B exemplifies the state where the user selects "outer screen" where the screen kind selection menu is displayed in the screen setting mode of the mobile communication terminal.

FIG. 5C exemplifies the state where the preview domain B on "outer screen" is indicated. FIG. 5D exemplifies the state where the image desired by user is displayed on the preview domain B as a result of performing the zoom function and the line-of-sight movement function. FIG. 5E exemplifies the display mode of "outer screen" set up by the procedure described above.

Referring back to FIG. 4F and FIG. 4G, it is known that the preview screen for setting up "normal screen" is identical with "normal screen" after completing setup. Furthermore, referring to FIG. 5D and FIG. 5E, it is known that the preview screen for setting up "outer screen" is identical with "outer screen" after completing setup.

According to the present invention, users are capable of setting up the desired mode of the screen after the users verify the mode of the screen to be setup through the preview screen. Therefore, users can readily and accurately set up the various forms of the screen.

As described in the above, the present invention has an advantage in that users are readily capable of setting screen by providing the preview screen in the image editing process for the screen setting of the mobile communication terminal. Moreover, the present invention has an effect that image edit errors are decreased as the image editing result for the screen setting shown in advance. As a result, it has an effect that the availability of the mobile communication terminal can be enhanced in accordance with the performance of a camera.

It will be apparent to those skilled in the art that various modifications and variation can be made in the present invention without departing from the spirit or scope of the invention. Thus, it is intended that the present invention cover modifications and variations of this invention within the scope of the appended claims and their equivalents.

What is claimed is:

1. A mobile communication terminal comprising:
    a display unit for displaying an image for a screen setting of the mobile communication terminal;
    a screen setting information storage unit for storing screen setting information of the mobile communication terminal;
    a key input unit for receiving a user selection of a type of screen to be edited for the screen setting of the mobile communication terminal and selection information of a user for an image edit command, wherein the received type of screen to be edited is selected from among a list of a plurality of available screen types output to the user;
    a controller for displaying a preview domain, which has a same type and size as the received type of screen, determined according to the user selection of the type of screen to be edited, controlling an image edit in the preview domain based on the selection information of the user for the image edit command, and setting up screen setting information displayed in the preview domain as screen setting information corresponding to the received type of screen if an image confirmation signal for the image displayed in the preview domain is input; and
    an image processor for changing indication information of the display unit by the control of the controller, wherein the indication information indicates, to the display unit, the preview domain,
    wherein set-up screen setting information corresponding to the received type of image comprises location information of the image that is displayed in the preview domain when the image confirmation signal is input,
    wherein the key input unit receives selection information of the user for confirming the image displayed in the display unit as an image of the screen in a screen setting mode of the mobile communication terminal and delivers selection information to the controller,
    wherein the controller stores information of the image displayed in the display unit as image information corresponding to the type of screen selected by the user when an image confirmation signal for the image displayed in the display unit is input,
    wherein the controller stores the image edited in the preview domain as the image corresponding to the type of screen selected by the user while an original copy of the image displayed in the display unit is maintained, and
    wherein the controller stores the edited image in the screen setting information storage unit.

2. The mobile communication terminal of claim 1, wherein the screen setting information storage unit stores screens which can be set up in the mobile communication terminal and size information, and image information corresponding to each of the screens.

3. The mobile communication terminal of claim 1, wherein the key input unit comprises a soft button implemented with a touch screen.

4. The mobile communication terminal of claim 3, wherein the soft button is displayed on the preview domain.

5. The mobile communication terminal of claim 1, wherein the image processor stores size information classified by the type of screen which can be set up in the mobile communication terminal in advance.

6. The mobile communication terminal of claim 1, wherein the controller stores size information classified by the type of screen which can be set up in the mobile communication terminal in advance, and transmits a control signal for displaying the preview domain for the selected screen and size information of the selected screen to the image processor.

7. The mobile communication terminal of claim 1, wherein the controller controls the image processor to enlarge or reduce the image displayed in the preview domain in response to selection information of the user for enlargement or reduction of the image.

8. The mobile communication terminal of claim 7, wherein the image processor stores a reference point and magnification information, enlarges or reduces the image in the preview domain based on the reference point and magnification information when a control signal for enlargement or reduction of the image is delivered from the controller.

9. The mobile communication terminal of claim 1, wherein the controller controls the image processor to move a center of the image displayed in the preview domain in response to selection information of the user for line-of-sight movement of the image.

10. The mobile communication terminal of claim 9, wherein the image processor stores movement interval information for moving the center of the image displayed in the display unit, and moves the center of the image displayed in the preview domain based on the movement interval information when the control signal for the line-of-sight movement of the image is delivered from the controller.

11. A screen setting method of a mobile communication terminal, the method comprising:
storing screen size information of a screen corresponding to a type of screen that can be set up in the mobile communication terminal;
displaying an image for screen setting;
receiving input of a screen setup mode request;
displaying a menu including a list of a plurality of available screen types;
receiving input of a type of screen to be edited, wherein the received type of screen to be edited is selected from among the displayed plurality of available screen types;
displaying a preview domain for selecting size information corresponding to the type of the inputted screen, and displaying, on the image, the preview domain having a screen size corresponding to the input type of screen;
enlarging or reducing the image to display in the preview domain in response to a zoom function request for enlarging or reducing the image;
moving a center of the image displayed in the preview domain in response to a line-of-sight movement request for the image; and
setting up screen setting information displayed in the preview domain as screen setting information corresponding to the input type of the screen if an image confirmation signal for the image displayed in the preview domain is input,
wherein the screen setting information corresponding to the received type of screen comprises location information of the image that is displayed in the preview domain when the image confirmation signal is input,
wherein the key input unit receives selection information of the user for confirming the image displayed in the display unit as an image of the screen in a screen setting mode of the mobile communication terminal and delivers selection information to the controller,
wherein the controller stores information of the image displayed in the display unit as image information corresponding to the type of screen selected by the user when an image confirmation signal for the image displayed in the display unit is input,
wherein the image edited in the preview domain is stored as the image corresponding to a type of screen selected by the user while an original copy of the image displayed in the preview domain is maintained, and
wherein the edited image is stored in a screen setting information storage unit for storing screen setting information of the mobile communication terminal.

12. The screen setting method of claim 11, further comprising displaying a soft button for receiving selection information of a user for screen setting on the image.

13. The screen setting method of claim 11, wherein the soft button is displayed in the preview domain.

14. The screen setting method of claim 11, wherein the selection information of the user is one of type input information of the screen, zoom function or line-of-sight movement request information, and the image displaying region selection completion signal.

15. The screen setting method of claim 11, wherein in the enlarging/reducing step, the corresponding image is magnified or reduced based on a stored reference point and magnification information for enlargement or reduction of the image.

16. The screen setting method of claim 11, wherein in the line-of-sight movement step, a center of the corresponding image is moved based on movement interval information stored for line-of-sight movement.

17. The screen setting method of claim 12, wherein in the preview domain-indicating step, the soft button for receiving selection information of the user for screen setting is displayed in the preview domain.

18. The screen setting method of claim 11, wherein in the screen setting information storing step, the image edited in the preview domain is stored in the image corresponding to the type of the screen selected by the user while the original copy of the image displayed in the image displaying step is maintained.

* * * * *